Feb. 14, 1939. J. W. McFARLANE ET AL 2,146,904
REFLECTION AND TRANSMISSION DENSITOMETER
Filed May 7, 1936 3 Sheets-Sheet 1
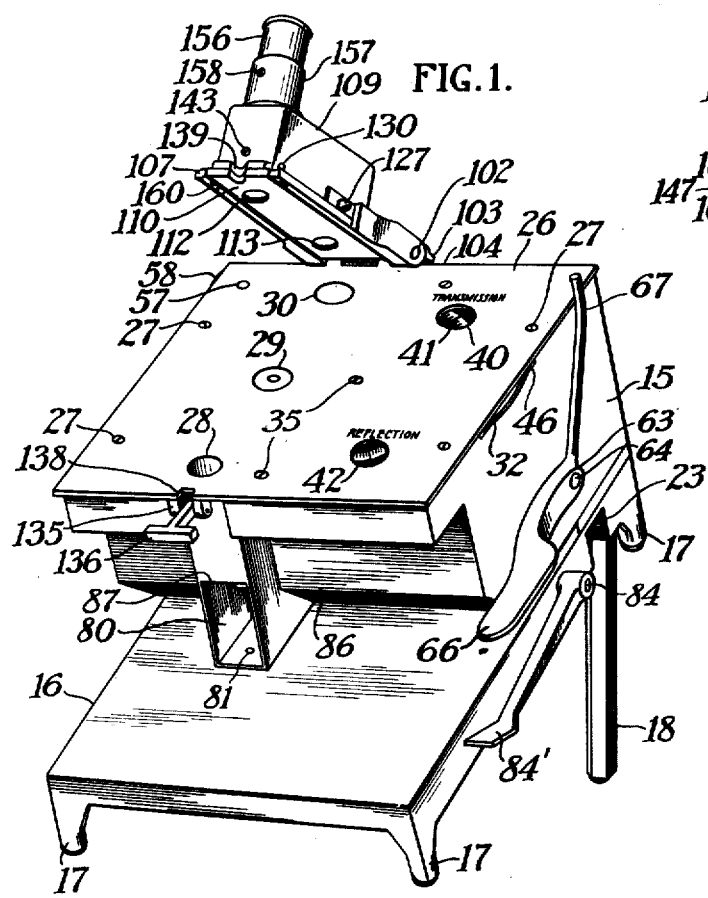
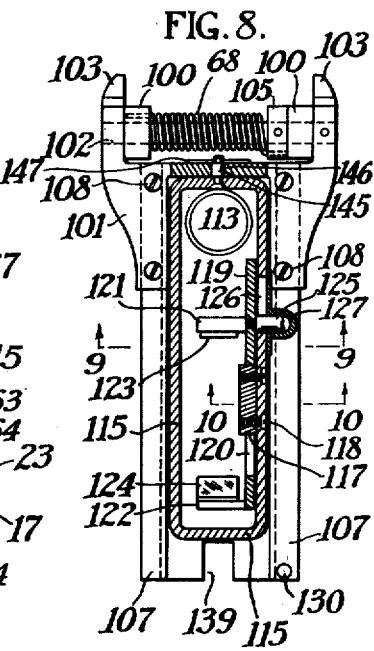
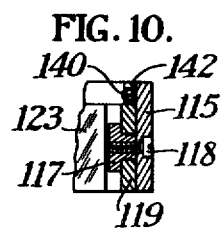
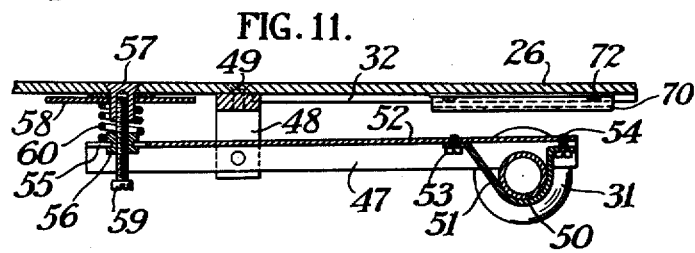
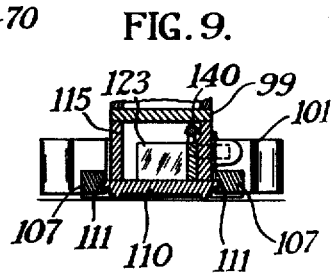
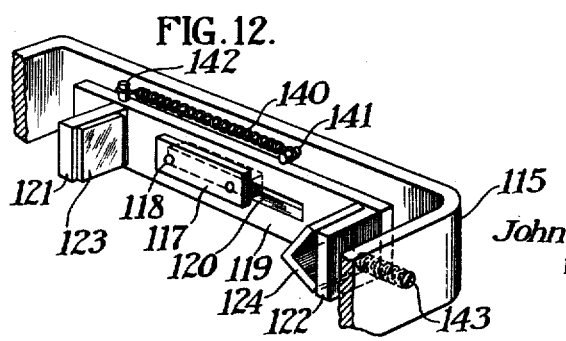
INVENTORS
John W. McFarlane & Charles A. Morrison
BY
ATTORNEYS

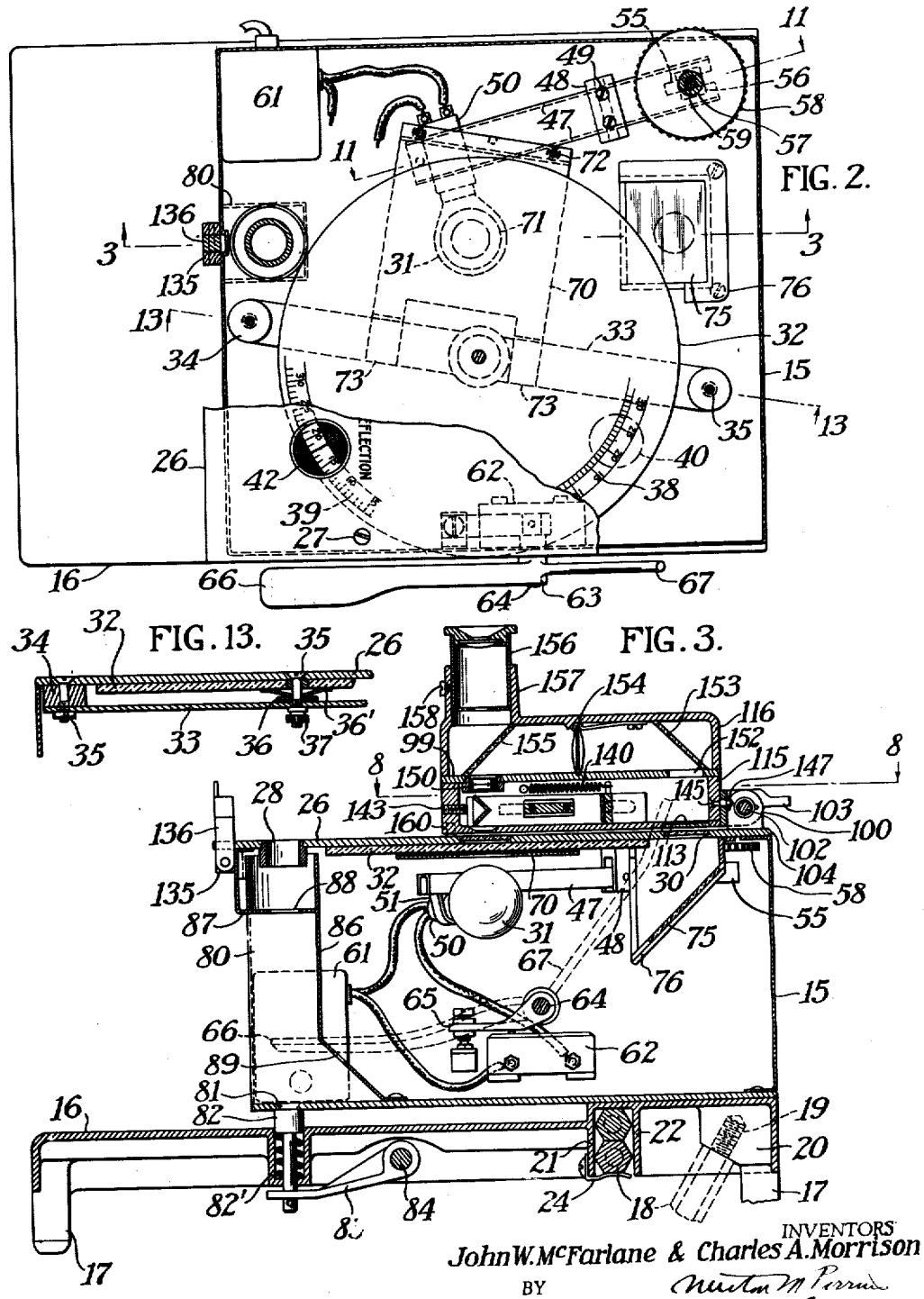

Feb. 14, 1939. J. W. McFARLANE ET AL 2,146,904
REFLECTION AND TRANSMISSION DENSITOMETER
Filed May 7, 1936   3 Sheets-Sheet 3
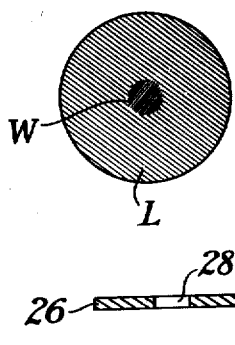
FIG. 5.
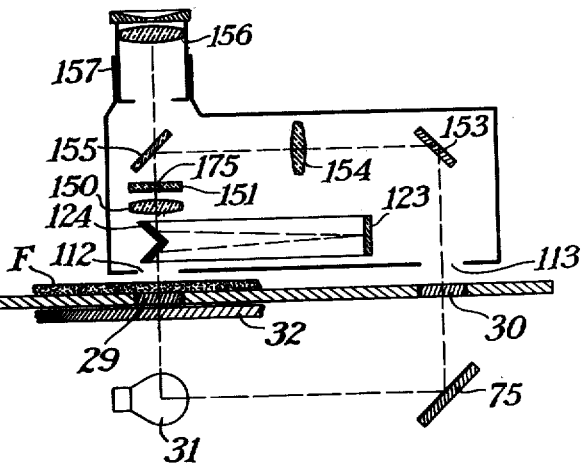
FIG. 4.
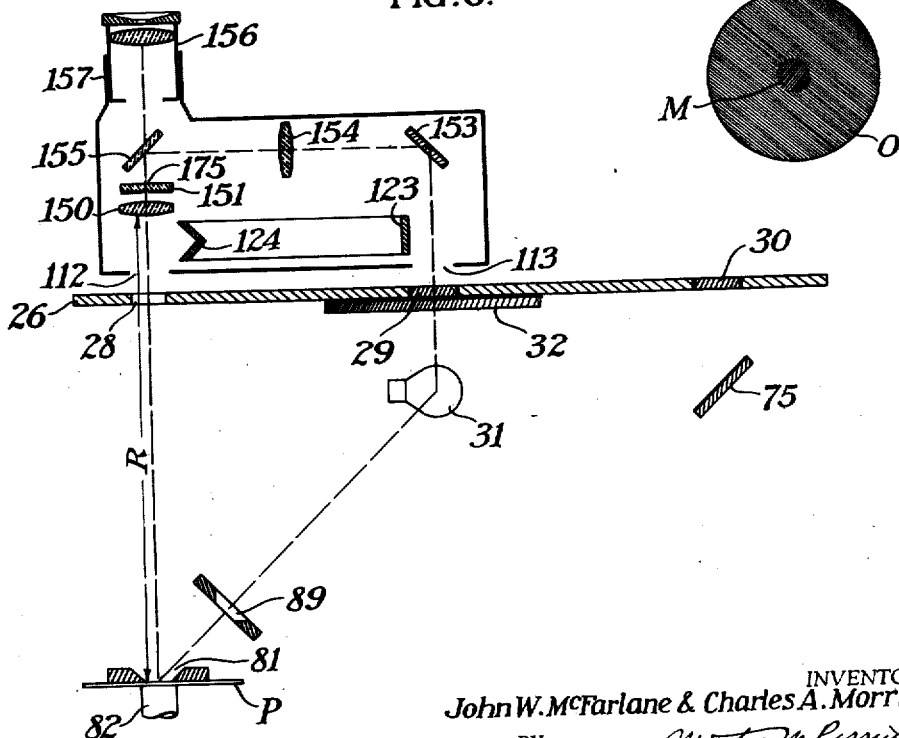
FIG. 6.
FIG. 7.
INVENTORS
John W. McFarlane & Charles A. Morrison
BY
ATTORNEYS Patented Feb. 14, 1939

2,146,904

UNITED STATES PATENT OFFICE 2,146,904

REFLECTION AND TRANSMISSION DENSITOMETER

John W. McFarlane and Charles A. Morrison, Rochester, N. Y., assignors, by mesne assignments, to Eastman Kodak Company, Jersey City, N. J., a corporation of New Jersey Application May 7, 1936, Serial No. 78,444

12 Claims. (Cl. 88—14)

This invention relates to photography and particularly to a universal densitometer adapted for measuring the densities of film negatives by the transmission principle, and also measuring the density of opaque copies by means of the reflection principle.

Densitometers find a wide use in photographic fields where the densities of films are used to definitely determine the exposure and printing times required to give the best results with given films and to thereby remove all guess work and rule of thumb methods previously used by process photographers. In the processing of sound film, wherein the sound track is on the margin of the film, it is absolutely necessary that the processing thereof be carried out so that the density of the sound track is controlled within well defined limits in order to get true tone reproduction. In cases where the control of density is as critical as that described in connection with the sound track of a film, it is obvious that the eye judgment of even an expert cannot be relied upon, especially in cases where the examination is continuous all day long day after day. Densitometers also find an extensive use in the graphic arts, and in this field the reflection densitometer is particularly useful because the reflection densities of colors and opaque bodies are essential for accurate color reproduction.

Therefore, one object of our invention is to provide a densitometer which is capable of measuring densities by either the reflection or transmission principle. Another object is to provide a combined reflection and transmission densitometer wherein the change from one type to the other is effected rapidly and easily by moving one part. And still another object is to provide a combined reflection and transmission densitometer wherein the optical system is adapted to be automatically altered to adapt the one instrument for the two purposes by simply moving the eye piece over the surface thereof. Another object is to combine a reflection and a transmission densitometer into one apparatus in such a compact and efficient manner that the combination of the two instruments operates and looks like a single unit. And yet another object is to combine a reflection and transmission densitometer into one compact instrument by having certain parts of the apparatus interchangeable and adapted for use when densities are measured either by the reflection or the transmission method.

Briefly, our invention consists of a housing the top of which is provided with two windows and an aperture which are in alignment with one another. A lamp is located in the housing directly below one of the windows and a rotating density wedge is interposed between the lamp and said window so that the rays of light passing therethrough can be varied in intensity. The light rays from said lamp are adapted to be reflected through the other window for transmission density measurements, or be reflected from a given surface of which the density is required through the aperture in the top of the housing.

A suitable optical head is slidably mounted on the top of the housing, so that a pair of windows therein can cover the two windows in the housing for transmission density measurements, or the aperture in the top of the housing and the window covered by the density wedge for measurements of densities by reflection. The optical head is provided with an eye piece and a suitable optical system whereby the two fields of light entering said head can be compared by means of concentric fields of light, the brightness of said fields being corrected by rotating the density wedge. The density wedge is calibrated with two sets of scales, one corresponding to transmission measurements and the other to reflection measurements, and these scales are visible through separate windows in the top of the housing so that the density measurements can be read directly. The optical system in the optical head is so arranged that it is automatically corrected for measurements of density by transmission or reflection as the head is moved to and from its two positions on the housing. A suitable switch is provided for flashing the lamp on and off for illuminating purposes, a platen is provided for releasably holding the copy of which the density is to be measured by reflection, and a suitable adjustment is provided for the lamp to correct the instrument for its zero reading.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a perspective of the densitometer with the optical head in a raised position, and showing a preferred embodiment of our invention, Fig. 2 is a top view of the densitometer with the optical head and part of the top plate removed to show the mechanism inside of the housing, Fig. 3 is a section taken substantially on line 3—3 of Fig. 2, but including the microswitch and its operating handle.

Fig. 4 is a diagrammatic view of the optical head in position on the housing for measuring densities by transmission, Fig 5 is a diagrammatic view of the comparison field when the optical head is in the position shown in Fig. 4.

Fig. 6 is a diagrammatic view of the optical head in position on the housing for measuring densities by reflection, Fig. 7 is a diagrammatic view of the comparision field when the optical head is in the position shown in Fig. 6, Fig. 8 is a detail view of the mounting for the optical head taken on line 8—8 of Fig. 3, Fig. 9 is a section taken on line 9—9 of Fig. 8, Fig. 10 is an enlarged section taken on line 10—10 of Fig. 8, Fig. 11 is an enlarged detail section taken on line 11—11 of Fig. 2, Fig. 12 is an enlarged detail perspective showing the method of mounting the movable mirror system in the tunnel of the optical head, and Fig. 13 is an enlarged detail section taken on line 13—13 of Fig. 2.

Like reference characters refer to corresponding parts in the several figures.

Referring now to Fig. 1, wherein a preferred embodiment of our invention is shown, 15 is a boxlike housing which is mounted on a phase 16. Base 16 is provided at the corners with four legs 17 on which the apparatus rests in a horizontal position, as shown in Fig. 3, when it is found desirable to use the apparatus in such a position. In order to use the apparatus in a tilted position, as shown in Fig. 1, a pair of long hexagonal legs 18, having threaded ends 19, are adapted to be screwed into tapped portions 20 formed at the two back corners of the base casting as indicated in Fig. 3. The base 16 as cast has two web members 21 and 22 formed thereon, said web members extending across the entire width of the base to form a chamber into which the legs 18 are adapted to be received thru an aperture 23 in the side of the base for storage and be frictionally held in place by means of a spring clip 24 as indicated in Fig. 3.

The housing 15 is provided with a top plate 26 which is fastened thereto by means of screws 27 so that said plate can be removed to allow access to the interior of the box. The top plate 26 is provided with three windows 28, 29 and 30 which are in alinement with one another, the distance between the centers of the windows 29 and 30 being equal to the distance between the centers of the windows 28 and 29. The windows 29 and 30 are covered with glass discs, preferably flashed opal glass, as indicated, while the window 28 is simply an aperture through the top plate for the purpose described hereinafter. As shown in Fig. 3, a lamp 31 is adjustably mounted on the underside of the top plate 26 in vertical alignment with window 29.

A bar member 33 is fixed to and spaced from the under side of said top plate 26 by means of spacers 34 and bolts 35, see Figs. 2 and 13. A circular density wedge 32 is rotatably mounted intermediate the lamp 31 and the window 29 by means of a bolt 35 which extends through the top plate 26, through a bushed aperture in the center of the wedge and finally through the bar member. A disc washer 36 and a spring washer 36' are provided to insure that the wedge is properly spaced between the top plate 26 and the bar member 33 for free rotation, and a thumb nut 37 lends itself toward easy removal or adjustment of the wedge.

The circular wedge 32 is provided on one face with a pair of specially calibrated scales 38 and 39, scale 38 being calibrated to give direct density readings when measuring densities by transmission while scale 39 is calibrated to give direct density readings when measuring densities by reflection. Scale 38 is adapted to be viewed through a window 40 in the top plate 26 which is marked "Transmission" and which is provided with a suitable index line 41, while scale 39 is adapted to be viewed through a similar window 42 in the top plate 26 which is marked "Reflection." Scales 38 and 39 are concentric with each other so that the scale for transmission purposes can not come in view of the window marked "Reflection" or vice versa. The density wedge is so mounted on the top plate 26 that a portion of its periphery extends through a slot in the side of the housing 15, as indicated at 46 in Fig. 1, so that the operator can rotate the same with his finger.

The lamp 31 is adjustably mounted in the housing 15 so that it can be shifted toward or away from the density wedge 32 to correct for any discrepancy in the zero reading of the density scales. For this purpose the mounting for the lamp 31 comprises a channel member 47, see Figs. 3 and 11, which is pivotally mounted intermediate its ends to a bracket 48 which is in turn fixed to the top plate 26 by a screw 49. At one end of the channel member 47 the vertical walls thereof are recessed so that the base 50 of the lamp 31 is adapted to lay at right angles thereto and be seated therein, said lamp being firmly held in place by means of a strap member 51 which is formed to encircle the base of the lamp and have its ends fixed to the base 52 of the channel member 47 by means of screws 53 and 54, see Fig. 11, screw 54 serving as a means of loosening or tightening said strap member 51 around the base of the lamp. At the other end of the channel member 47, the base 52 thereof is provided with an elongated slot 55 in which a square grooved nut 56 is adapted to slide but not turn. A blind nut member 57 extending through the top plate 26 is adapted to rotate relative to said top plate and be controlled by the adjusting disc 58 which extends beyond the edge of said top plate, as indicated in Fig. 2, for operating purposes. A bolt 59 is screwed through the nut 56 and is received in the blind nut 57 so that as the blind nut is rotated by the disc 58 the bolt 59 and the channel member 47 are adjusted toward and away from the top plate 26 depending upon the direction of rotation of the disc 58, and the lamp on the other end of the channel member 47 is adjusted relative to the density wedge. A compression spring 60 is interposed between the channel member 47 and disc 58 to constantly force the channel member away from the top plate 26 to hold the blind nut 57 in position therein.

The lamp 31 is of low voltage, so in order to be able to plug the densitometer into a 110 v. line, a transformer 61 of suitable capacity is inserted in the electric circuit. A microswitch 62 is also inserted into the lamp circuit so that the lamp can be turned on by the operator only during the time that a measurement is being made, because it is a well known fact that continuous heat, and especially the heat from a lamp with the required proximity, quickly deteriorates the quality of a density wedge. The microswitch 62 is operated by means of a double armed lever 63 which is pinned to a rotating shaft 64 on the other end of which is pinned a toggle arm 65. The double armed lever 63 comprises one arm 66 which extends substantially parallel to the side of the housing 15, see Fig. 1, and to which a downward pressure is applied for operating the switch 62, and a second arm 67 which extends above the top plate 26 so that the switch can be operated by pulling thereon with one finger. The switch arm 63 is so located on the housing and is so shaped that the operator can hold down the switch, and rotate the density wedge, or move the copy to be measured at the same time with one hand while looking into the eyepiece of the apparatus.

To further protect the density wedge 32 from the effect of heat radiated by the lamp 31, a metal shielding plate 70 is fixed to the under side of the top plate 26, said plate being provided with an aperture 71 in alignment with the window 29 and the lamp 31. This shielding plate 70 is fixed to the top plate 26 by having one end screwed thereto by screws 72 while the other end is suitably cut out to form bent arms 73 which are adapted to rest on the cross bar 33. An opal glass plate 75 is suspended from the underside of the top plate 26 by means of a bracket 76 said opal glass plate being so located that it is adapted to reflect rays of light from the lamp 31 through the window 30 in the top plate 26.

The forward end of the boxlike housing 15 is provided with a reflection tunnel 80 which cooperates with the aperture or window 28 in the top plate 26. An aperture 81 is provided in the bottom of the reflection tunnel 80 and the copy of which the density is to be measured by reflection is adapted to be releasably held under this aperture 81 by means of a spring plunger 82 which is normally spring pressed into engaged position by spring 82' and which is operated by means of a lever 83 pinned to a rotatable shaft 84, said shaft 84 extending externally of the base 16 and being controlled by an operating lever 84' pinned thereto. The forward end of the housing 15 comprises an angular member 86 one portion 87 of which cuts the reflection tunnel 80 transversely, and is provided with an aperture 88 which is in alignment with the window 28 in the top plate 26 and the aperture 81 in the bottom of the tunnel 80. The vertical and oblique portions of the angular member 86 form the rear part of the reflection tunnel 80 and the oblique portion thereof is provided with a suitable opening 89 which is so located that rays of light from the lamp 31 are allowed to pass into the reflection tunnel 80, illuminate a copy mounted at the aperture 81, then be reflected up through the tunnel 80 and through the window 28 in the top plate 26.

The rear edge of the top plate 26 is provided with a pair of upstanding lugs 100 to which a yoke shaped supporting member 101 is pivoted by means of pin 102 to rotate with respect to said top plate. The yoke shaped supporting member 101 is provided with a pair of extending fingers 103 which are adapted to engage the rear edge 104 of the top plate 26, see Figs. 3, 8, to prohibit the supporting member from being rotated beyond a substantially vertical position. A coiled spring 68 is wrapped around the pin 102 and has one end fixed in one of the lugs 100 while the other end is fixed in a collar 105 pinned to the pin 102 so that said spring tends to rotate the pin and the supporting member 101 to a raised position to counterbalance the weight of the supporting member and its associated structure, and tend to hold it in any desired position of elevation.

A pair of guide ways 107 are fixed to the yoke shaped supporting member 101 by means of screws 108 so as to be rotatable therewith. An optical head, indicated broadly by reference 109 in Fig. 1, is slidably mounted in said guide ways 107 to be moved between two positions on said top plate 26, one for measuring densities by transmission and the other for measuring densities by reflection as will be fully described hereinafter. The optical head 109 consists of a base plate 110 the sides of which are provided with guides 111 for slidably engaging the guide ways 107. This base plate 110 is provided with a pair of glass covered windows 112 and 113 which are suitably spaced apart as to be in alignment with the windows 29 and 30 in the top plate 26 for transmission measurements, or in alignment with windows 28 and 29 in the top plate when the optical head is slid down for reflection measurements.

On the base plate 110 is mounted a tunnel consisting of chambers 115 and 116 which are separated by a partition 99, said chambers and partition supporting and housing the optical system described below. Referring to Figs. 3, 8, 10 and 12, a gib 117 is fixed to one side wall of the chamber 115 by means of screws 118. A slide 119 provided with an elongated slot 120 is slidably mounted on said gib 117 so as to have a limited sliding movement relative to said chamber 115. Two mirror supports 121 and 122 are fixed to said slide 119 and are definitely spaced from one another so that when a mirror 123 is mounted on the support 121 and an angular mirror 124 is mounted on support 122 the two mirrors will be properly positioned relative to one another for cooperating with the rest of the optical system as described hereinafter. Referring particularly to Fig. 8, a screw 125 fixed to the slide 119 is adapted to extend through an elongated slot 126 in the wall of chamber 115. A cap member 127 is fixed to said screw 125 to overlap the slot 126 for the purpose of covering said slot 126 in the chamber 115 to prevent the admission of dust into the chamber. In Figs. 3, 8, 10, and 12, the optical head is shown in position for measuring densities by transmission, and the slidable mirror system just described is located in alignment with the window 112 in the base 110 of the optical head. A pin 142 is fixed to the slide 119 and another pin 141 is fixed to the wall of the chamber 115. A spring 140 is fixed between these two pins under tension to constantly pull said slide 119 forward of the chamber 115 against a locating screw 143 which is screwed through the end of said chamber. This locating screw 143 is carefully adjusted so that the mirror system 123 and 124 on the slide 119 will be properly aligned with the window 112 when the optical head is in position to measure densities by transmission. As the optical head is pulled forward to the position for measuring densities by reflection, the chamber 115 moves forward and along with it the slidable mirror system due to the tension in spring 140 until the screw 125 and its cap 127 fixed to said mirror system hits a pin 130 which is fixed on the forward end of the guideway 107. At this point the mirror system comes to rest but the chamber is allowed to move forward until the screw 125 comes to the end of the slot 126 in the chamber 115 in which position the windows 112 and 113 in the optical head are in alignment with windows 28 and 29 in top plate 26 for measuring densities by reflection. This construction automatically removes the slidable mirror system from cooperation with the rest of the optical system for measuring densities by reflection, as shown in Fig. 6, and for the purpose described hereinafter. In order to lock the optical head in the reflection position the forward end of the top plate 26 is provided with a pair of lugs 135 between which a T shaped clamp 136 is rotatably mounted by a pin connection. The top plate 26 is suitably slotted, as shown at 138, so that the T clamp can be raised to a vertical position and engage another slot 139 in the forward end of the base plate of the optical head 109.

When the optical head 109 is slid from the reflection position to the transmission position, the slide 119, on which the mirror system 123 and 124 is located, is picked up by virtue of the screw 125 and slot 126 engagement, and the mirror system is slid along with the chamber 115, thereby tensioning spring 140 and forcing the mirror system against the locating screw 143. For frictionally holding the optical head 109 in its transmission position, a pin 145 which is fixed to the rear of the chamber 115 is adapted to extend through an aperture 146 in the yoke shaped support 101 and be engaged by a suitable spring member 147 fixed thereon in the manner of a snap clasp.

In the partition 99 a lens 150 and a surface mirror 151 reflecting side up, with the silver removed from a small central portion 175, are mounted in alignment with the window 112 in the base plate 110, and an aperture 152 is provided in alignment with the window 113. The chamber 116 contains a silvered mirror 153, a condenser 154, and an unsilvered glass plate 155, which combine the light rays entering the windows 112 and 113 on a comparison field which can be viewed through the sight tube 156 which is frictionally engaged in a cylindrical portion 157 by a set screw 158.

Referring now to Figs. 4–7, wherein diagrammatic views of our apparatus are shown, the operation of the device in both reflection and transmission positions will be described. The first step to be taken before any measurements are made is to check the instrument for a correct zero reading. This is done by placing a density scale having a white portion of known zero density under the optical head 109 so that it is intermediate the window 29 in the top plate 26 and the window 112 in the base plate 110 of the optical head. A comparison field as shown in Fig. 5, will be formed by the mirror 151 and will be seen in the sight tube. Then by rotating the density wedge 32 the discs of light in the comparison field can be brought to the same brightness, and when they are of the same brightness, the transmission scale on the density wedge should give a zero reading. If the scale does not give a zero reading, the disc 58 should be rotated in the required direction to thereby shift the lamp 31 toward or away from the density wedge to alter the amount of transmitted light until the scale is correctly set at zero.

To measure densities in a transparency the optical head 109 is slid toward the rear of the top plate 26 as far as it will go, where the spring clamp engages it, as described above, and it is frictionally locked in position for measuring transparencies. The optical head is raised on its pivotal mounting and the film F to be measured is placed over window 29 in the top plate 26. The optical head is then lowered into contact with the film F, said film being held in place by rubber pads 160 fixed on the under side of the guide ways 107. The switch lever 63 is then depressed and the lamp 31 is illuminated. Referring to Fig. 4, it will be seen that one set of light rays will pass through the density wedge 32, the window 29, through the transparency F, onto one side of the angular mirror 124, then be reflected to mirror 123 and back to the other side of this angular mirror 124, through the imaging lens 150 and finally be viewed through the small unsilvered portion 175 in the mirror 151, giving the inside area marked W on the comparison field shown on Fig. 5 which is a diagrammatic view of what is seen in the eyepiece or sight tube. Simultaneously light rays from the lamp 31 are reflected from the opal glass plate 75, through window 30, onto a mirror 153, thence through the condenser 154. From the condenser 154 the light strikes the glass plate 155 and is reflected downwards onto the silvered portion of the upturned mirror 151, where it forms a constant light area concentric with the one marked W and which is noted as L in Fig. 5. The optical system of the instrument is so designed that the brightness of the outer constant field L, Fig. 5, is such that the brightness of the variable transmitted field W can be altered to have the same brightness by rotating the density wedge 32, even in the case where the densest negative to be encountered is placed in measuring position.

The comparison field thus formed on mirror 151 is viewed through the sight tube and the density wedge 32 is rotated in the proper direction until the area marked W assumes the same brilliancy as the area marked L. When this point is reached the lamp switch 63 is released and the density is found under the index line 41 of the window 40 which is marked "Transmission." This procedure can be repeated over the entire area of a transparency by merely shifting said transparency relative to the window 29 in the top plate 26 and repeating the above procedure. For transmission measurements the instrument has a constant field brightness irrespective of the density value to be measured.

Now in order to measure the reflection density of a print, the optical head 109 is slid forward as far as it will go and it is fastened in position with the T shaped clamp 136. In this position of the optical head, the windows 112 and 113 in the base plate 110 are in alignment with the windows 28 and 29 on the top plate 26 respectively as shown in Fig. 6. When the optical head is moved to the reflection position the slidable mirror system, including mirrors 124 and 123, is automatically moved out of the optical path as described above so that the distance R is now equal to the optical distance between the transparency of Fig. 4 and the image lens 150. The clamp lever 84' is then depressed and the print P to be measured is inserted under the opening 81 in the base of the housing 15. The clamp lever is then released and the print is held in position. The print P is then illuminated by rays of light emanating from the lamp 31 which pass through the aperture 89 in the housing wall. From the print the light rays are reflected diffusely upwardly through the aperture or window 28 in the top plate 26, through the window 112 in the optical head, to the image lens 150. Through the sight tube 156 this area of light appears on the comparison field as M in Fig. 7. Simultaneously rays of light from the lamp pass through the density wedge 32, through the windows 29 and 113, into the mirror 153 from which they are reflected through the condenser 154. From the condenser the light rays pass to the glass plate 155 from which they are reflected downwards to the mirror 151 whereon the comparison field is again formed, the latter area appearing as shown by the area marked O in Fig. 7 when viewed through the sight tube 156. The density wedge 32 is now rotated in the required direction this time varying the light area marked O, until it corresponds in brightness to the light area marked M. When the areas M and O are indistinguishable from one another the density is directly read under the index 41 in the window 42 marked "Reflection."

The same size of area is used for both transmission and reflection measurement, and said area is such that the observer sees no pattern whatever, but merely a uniform field irrespective of the coarseness of the half-tone print or negative.

Although we have shown and described certain specific embodiments of our invention, we are fully aware that many modifications thereof are possible. Our invention, therefore, is not to be restricted except insofar as is necessitated by the prior art and by the spirit of the appended claims.

We claim:

1. In a reflection and transmission densitometer the combination with a housing, a window therein over which a density to be measured by reflection may be positioned, a lamp in said housing in alignment with said window, a density wedge interposed between said window and said lamp, a second window in said housing and spaced from the first window, means for reflecting light from said lamp through said second window, an aperture in said housing, holding means in said housing for holding a copy of which the density is to be measured by reflection in a position such that the copy will be illuminated by said lamp and will reflect light through said aperture, of an optical head movably mounted on said housing for movement between two extreme positions, two windows in said head adapted to be aligned with the two windows in the housing in one position of the head and aligned with the directly illuminated window and said aperture in the other position of the head, an eye-piece on said optical head, an optical system in said head and arranged to receive light rays passing through the windows in the head to form a comparison field visible through the eye-piece, and means actuated by the movement of the head from one position to the other for altering the optical system whereby the length of the light path from the window over which the density to be measured is positioned to the eye-piece in one position of the head will be maintained equal to the length of the light path from the copy holding means to the eye-piece in the other position of the head.

2. In a reflection and transmission densitometer the combination of a box-like housing, a lamp in said housing, a window in the top of said housing in alignment with said lamp, a calibrated density wedge mounted intermediate said window and said lamp, a second window and an aperture in the top of said housing equally spaced from said first window, means in said housing adapted to reflect rays of light from said lamp through the second window, holding means in the housing for holding a copy of which the density is to be measured by reflection in such a position that the copy will be illuminated by said lamp and will reflect light through the aperture in said housing, positioning means adapted to locate a density in the path of the light rays passing through the window in alignment with the lamp, a guide member mounted on the top of said housing, an optical head movably mounted on said guide member for movement between two extreme positions, a pair of windows in said optical head adapted to be aligned with the two windows in the housing in one of said two positions and aligned with the aperture and the window in its other position, means for locking said optical head in either of its two positions, a sight tube on said optical head, an optical system in said optical head registering with the windows therein to direct the light rays passing therethrough onto a comparison field in concentric fields of light visible through the sight tube, and means actuated by movement of the head from one position to the other for altering the optical system in the head to maintain the length of the light path from the density positioning means to the sight tube in one position of the head equal to the length of the light path from the copy holding means to the sight tube in the other position of the head.

3. In a reflection and transmission densitometer the combination of a box-like housing, a lamp in said housing, a window in the top of said housing in alignment with said lamp, a calibrated density wedge mounted intermediate said window and said lamp, a second window and an aperture in the top of said housing equally spaced from said first window, means in said housing adapted to reflect rays of light from said lamp through the second window, holding means in the housing for holding a copy of which the density is to be measured by reflection in such a position that the copy will be illuminated by said lamp and will reflect light through the aperture in said housing, positioning means adapted to locate a density in the path of the light rays passing through the window in alignment with the lamp, a guide member mounted on the top of said housing, an optical head movably mounted on said guide member for movement between two extreme positions, a pair of windows in said optical head adapted to be aligned with the two windows in the housing in one of said two positions and aligned with the aperture and the window in alignment with the lamp in its other position, means for locking said optical head in either of its two positions, a sight tube on said optical head, an optical system in said optical head registering with the windows therein to direct the light rays passing therethrough onto a comparison field in concentric fields of light visible through the sight tube, means for maintaining the length of the light path between the density positioning means and the sight tube in one position of the head equal to the length of the light path between the copy holding means and the sight tube in the other position of the head, said means including a mirror system movably mounted in said head to be moved into and out of the path of light passing through one of the windows in the housing to the comparison field to change the length thereof and a connection between said mirror system and the head whereby movement of the head moves the mirror system.

4. In a reflection and transmission densitometer the combination of a box-like housing, a lamp adjustably mounted therein, a window in the top of said housing in alignment with said lamp, a calibrated density wedge rotatably mounted in said housing between said window and the lamp, a second window and an aperture in the top of said housing equally spaced from said first window, means in said housing for reflecting light from the lamp through said second window, holding means in the housing for holding a copy of which the density is to be measured by reflection in such a position that the copy will be illuminated by said lamp and will reflect light through the aperture in said housing, positioning means adapted to locate a density in the path of the light rays passing through the window in alignment with the lamp, an optical head movably mounted on the top of the housing for movement between two extreme positions and including two spaced windows adapted to register in one position of the head with the two windows in the top of the housing and in the other position of the head to register with the window in alignment with the lamp and the aperture, an eye-piece on said head, an optical system in the head and arranged to receive light passing through the two windows in the head and form a comparison field visible through said eye-piece, correcting means mounted in said optical head for movement into and out of the path of light entering one of the windows in said head to alter the length of said path, said correcting means connected to the head to be moved into and out of its operative position in said head by movement of the head between its two positions whereby the length of the light path between the copy holding means and the eye-piece in one position of the head is automatically maintained equal to that of the light path between the density positioning means and said eye-piece in the other position of the head.

5. In a reflection and transmission densitometer the combination with a box-like housing, a lamp adjustably mounted therein, a window in the housing in alignment with the lamp, a density wedge rotatably mounted in said housing between the lamp and said window, a second window and an aperture in said housing and equally spaced from said first window, means for directing rays of light from the lamp through said second window, holding means for holding a copy of which the density is to be measured by reflection in such a position that the copy will be illuminated by said lamp and will reflect light through the aperture in said housing, positioning means adapted to locate a density in the path of the light rays passing through the window in alignment with the lamp, an optical head movably mounted on said housing for movement between two extreme positions and having two windows adapted to register in one position of the head with the two windows in the housing and in the other position of the head to register with the window in alignment with the lamp and the aperture, a sight tube on said optical head, an optical system in said optical head registering with the windows therein to form a comparison field to be viewed by the eye-piece, a correcting means movably mounted in the head to be moved into and out of one of the paths of light entering the head to alter the length thereof for maintaining the length of the path of light between the copy holding means and the eye-piece in one position of the head equal to that of the path of light between the density positioning means and the eye-piece in the other position of the head, and a lost motion connection between the correcting means and the head whereby the correcting means is automatically moved into and out of its operative position upon movement of the head from one extreme position to the other.

6. In a reflection and transmission densitometer, the combination of a box-like housing, the top of which is provided with two windows and an aperture spaced one from the other, a lamp in said housing in alignment with one of the windows whereby light rays therefrom pass through said window, means in the housing for directing rays of light from the lamp through the other window, holding means in the housing for holding a copy of which the density is to be measured in such a position that the copy will be illuminated by said lamp and will reflect light through the aperture in the housing, positioning means for holding a density to be measured over the window in the housing in alignment with said lamp, an optical head slidably mounted on the top of the housing in covering relation with the windows and aperture therein for movement between two extreme positions, said head provided with a pair of spaced windows which in one position of the head are aligned with the two windows in the housing and which in the other position of the head are aligned with the window in alignment with the lamp and the aperture in the housing, an optical system in said head registering with the windows therein to collect the light rays entering the windows and form a comparison field in the head, and a reflecting device slidably mounted in the optical head near one of the windows therein for movement into and out of the path of light entering said window to change the length of the light path entering said window for making the length of the light path between the copy holding means and the comparison field in one position of the head equal to the length of the light path between the density positioning means and the comparison field in the other position of the head.

7. In a reflection and transmission densitometer the combination of a box-like housing, a lamp in said housing, a window in the top of said housing in alignment with said lamp, a calibrated density wedge mounted intermediate said window and said lamp, a second window and an aperture in the top of said housing equally spaced from said first window, means in said housing adapted to reflect rays of light from said lamp through the second window, holding means in the housing for holding a copy of which the density is to be measured by reflection in such a position that the copy will be illuminated by said lamp and will reflect light through the aperture in said housing, positioning means adapted to locate a density in the path of the light rays passing through the window in alignment with the lamp, a guide member mounted on the top of said housing, an optical head movably mounted on said guide member for movement between two extreme positions, a pair of windows in said optical head adapted to be aligned with the two windows in the housing in one of said two positions and aligned with the aperture and the window in alignment with the lamp in its other position, means for locking said optical head in either of its two positions, a sight tube on said optical head, an optical system in said optical head registering with the windows therein to direct the light rays passing therethrough onto a comparison field in concentric fields of light visible through the sight tube, means for maintaining the length of the light path between the density positioning means and the sight tube in one position of the head equal to the length of the light path between the copy holding means and the sight tube in the other position of the head, said means comprising a carriage movably mounted in said optical head, a mirror system fixed to said carriage to be moved therewith, said carriage being capable of movement whereby the mirror system is adapted to be moved between two extreme positions, one position wherein it is added to the optical system to increase the length of one path of light entering the same, and the other wherein it is removed from the optical system, and a connection between the head and the carriage whereby the mirror system is automatically moved into or out of the optical system when the head is moved between its two positions.

8. In a reflection and transmission densitometer the combination of a box-like housing, a lamp in said housing, a window in the top of said housing in alignment with said lamp, a calibrated density wedge mounted intermediate said window and said lamp, a second window and an aperture in the top of said housing equally spaced from said first window, means in said housing adapted to reflect rays of light from said lamp through the second window, holding means in the housing for holding a copy of which the density is to be measured by reflection in such a position that the copy will be illuminated by said lamp and will reflect light through the aperture in said housing, positioning means adapted to locate a density in the path of the light rays passing through the window in alignment with the lamp, a guide member mounted on the top of said housing, an optical head movably mounted on said guide member for movement between two extreme positions, a pair of windows in said optical head adapted to be aligned with the two windows in the housing in one of said two positions and aligned with the aperture and the window in alignment with the lamp in its other position, means for locking said optical head in either of its two positions, a sight tube on said optical head, an optical system in said optical head registering with the windows therein to direct the light rays passing therethrough onto a comparison field in concentric fields of light visible through the sight tube, means for maintaining the length of the light path between the density positioning means and the sight tube in one position of the head equal to the length of the light path between the copy holding means and the sight tube in the other position of the head, said means comprising a carriage movably mounted in said optical head, a mirror system fixed to said carriage to be moved therewith, said carriage being capable of movement whereby the mirror system is adapted to be moved between two extreme positions, one position wherein it is added to the optical system to increase the length of one path of light entering the same, and the other wherein it is removed from the optical system, said mirror system including a V-shaped mirror and a plain mirror spaced apart a fixed distance, and a connection between the head and the carriage whereby the mirror system is automatically moved into or out of the optical system when the head is moved between its two positions.

9. In a reflection and transmission densitometer the combination of a box-like housing, a lamp in said housing, a window in the top of said housing in alignment with said lamp, a calibrated density wedge mounted intermediate said window and said lamp, a second window and an aperture in the top of said housing equally spaced from said first window, means in said housing adapted to reflect rays of light from said lamp through the second window, holding means in the housing for holding a copy of which the density is to be measured by reflection in such a position that the copy will be illuminated by said lamp and will reflect light through the aperture in said housing, positioning means adapted to locate a density in the path of the light rays passing through the window in alignment with the lamp, a guide member mounted on the top of said housing, an optical head movably mounted on said guide member for movement between two extreme positions, a pair of windows in said optical head adapted to be aligned with the two windows in the housing in one of said two positions and aligned with the aperture and the window in alignment with the lamp in its other position, means for locking said optical head in either of its two positions, a sight tube on said optical head, an optical system in said optical head registering with the windows therein to direct the light rays passing therethrough onto a comparison field in concentric fields of light visible through the sight tube, means for maintaining the length of the light path between the density positioning means and the sight tube in one position of the head equal to the length of the light path between the copy holding means and the sight tube in the other position of the head, said means comprising a carriage movably mounted in said optical head, a mirror system fixed to said carriage to be moved therewith, said carriage being capable of movement whereby the mirror system is adapted to be moved between two extreme positions, one position wherein it is added to the optical system to increase the length of one path of light entering the same, and the other wherein it is removed from the optical system, a pin and slot connection between the head and the carriage whereby the mirror system is moved into or out of the optical system automatically by movement of the head between its two positions, and a spring between the carriage and the head for normally forcing the carriage toward one end of its path of movement within the head.

10. In a reflection and transmission densitometer the combination of a box-like housing, a lamp adjustably mounted in said housing, a window in said housing in alignment with said lamp, a calibrated density wedge mounted between the lamp and said window, two windows in said housing equally spaced from said first window, means in said housing adapted to reflect rays of light from said lamp through one of said two windows, means in the housing for holding a copy of which the density is to be measured whereby the copy will be illuminated by said lamp and reflect light through the other of said two windows, a guide member hingedly mounted on said housing, an optical head slidably mounted on said guide member for movement between two extreme positions, two windows in said optical head adapted to register with said window in alignment with the lamp and one of said other windows in each position of said optical head, a sight tube on said optical head, an optical system in said optical head registering with the two windows therein and adapted to direct the two light paths entering said head onto a comparison field in line with said sight tube in concentric fields, positioning means adapted to locate a density in the path of light rays passing through the housing window in alignment with the lamp, means for maintaining the length of the light path between the density positioning means and the sight tube in one position of the head equal to that of the light path between the copy holding means and the sight tube in the other position of the head, said means including an optical arrangement movably mounted in and connected to the head so as to be automatically moved into and out of the optical system in the head to alter the length of one of the paths of light passing therethrough when the head is moved from one position to the other.

11. In a reflection and transmission densitometer, the combination of a box-like housing the top of which is provided with two windows and an aperture spaced from each other, a track hinged to the top of said housing, a lamp carried in the housing in alignment with one of said windows whereby light rays therefrom pass through said window, means in said housing adapted to reflect rays of light from said lamp through the other window, holding and positioning means adapted to locate a density in the path of the light rays passing through the window in alignment with the lamp, means in the housing for holding a copy of which the density is to be measured whereby the copy will be illuminated by said lamp and will reflect light through the aperture in said housing, an optical head slidably mounted on said track in covering relation with the windows and aperture in the housing for movement between two extreme positions, and provided with a pair of windows which in the first position of the optical head are aligned with the two windows in the top of the housing to receive the light rays passing therethrough, and which in the second position of the head are aligned with the window in alignment with the lamp and the aperture in the housing, an optical system in said head and arranged to receive light rays entering the windows therein to form a comparison field in the head, and a reflecting device slidably mounted in the optical head near one of the windows therein for movement into and out of the path of light entering that window for changing the length of the path of light entering that window, and for making the length of the light path from the copy holding means to the comparison field in the second position of the head equal to that of the light path from the density positioning means to the comparison field in the first position of the head.

12. In a reflection and transmission densitometer the combination of a box-like housing the top of which is provided with two windows and an aperture, a lamp carried in the housing in alignment with one of said windows whereby the light rays therefrom pass through the window, means in said housing adapted to reflect rays of light from said lamp through the other window, holding means in the housing for holding a copy of which the density is to be measured whereby the copy will be illuminated by said lamp and will reflect light through the aperture in said housing, positioning means adapted to locate a density in the path of the light rays passing through the window in the housing in alignment with the lamp, a track hinged to the top of said housing, an optional head slidably mounted on said track in covering relation with the windows and aperture in the housing, for movement between two extreme positions on the top of the housing, said optical head provided with a pair of windows which upon movement of the optical head to one position are placed over the two windows in the housing to receive the light passing therethrough, and which in the other position of the head are aligned with the window in alignment with the lamp and the aperture in the housing, an eye-piece on the optical head, an optical system in said head and arranged to receive light rays entering therein to form a comparison field visible in the eye-piece, means for making the length of the light path between the density positioning means and the eye-piece in one position of the head equal to that of the light path between the copy holding means and the eye-piece in the other position of the head, said means including a mirror system slidably mounted in the optical head for movement between one position wherein it is added to the optical system to increase the length of the light path entering one window in the head, and a second position wherein it is removed from the optical system, and a gib and slot connection between the head and the mirror system whereby movement of the head between its two positions inserts or removes the mirror system from the optical system therein.

JOHN W. McFARLANE.
CHARLES A. MORRISON.

CERTIFICATE OF CORRECTION.

Patent No. 2,146,904.  February 14, 1939.

JOHN W. McFARLANE, ET AL.

It is hereby certified that error appears in the printed specification of the above numbered patent requiring correction as follows: Page 8, second column, line 20, claim 12, for the word "optional" read optical; and that the said Letters Patent should be read with this correction therein that the same may conform to the record of the case in the Patent Office.

Signed and sealed this 2nd day of May, A. D. 1939.

Henry Van Arsdale (Seal) Acting Commissioner of Patents.

the path of light rays passing through the housing window in alignment with the lamp, means for maintaining the length of the light path between the density positioning means and the sight tube in one position of the head equal to that of the light path between the copy holding means and the sight tube in the other position of the head, said means including an optical arrangement movably mounted in and connected to the head so as to be automatically moved into and out of the optical system in the head to alter the length of one of the paths of light passing therethrough when the head is moved from one position to the other.

11. In a reflection and transmission densitometer, the combination of a box-like housing the top of which is provided with two windows and an aperture spaced from each other, a track hinged to the top of said housing, a lamp carried in the housing in alignment with one of said windows whereby light rays therefrom pass through said window, means in said housing adapted to reflect rays of light from said lamp through the other window, holding and positioning means adapted to locate a density in the path of the light rays passing through the window in alignment with the lamp, means in the housing for holding a copy of which the density is to be measured whereby the copy will be illuminated by said lamp and will reflect light through the aperture in said housing, an optical head slidably mounted on said track in covering relation with the windows and aperture in the housing for movement between two extreme positions, and provided with a pair of windows which in the first position of the optical head are aligned with the two windows in the top of the housing to receive the light rays passing therethrough, and which in the second position of the head are aligned with the window in alignment with the lamp and the aperture in the housing, an optical system in said head and arranged to receive light rays entering the windows therein to form a comparison field in the head, and a reflecting device slidably mounted in the optical head near one of the windows therein for movement into and out of the path of light entering that window for changing the length of the path of light entering that window, and for making the length of the light path from the copy holding means to the comparison field in the second position of the head equal to that of the light path from the density positioning means to the comparison field in the first position of the head.

12. In a reflection and transmission densitometer the combination of a box-like housing the top of which is provided with two windows and an aperture, a lamp carried in the housing in alignment with one of said windows whereby the light rays therefrom pass through the window, means in said housing adapted to reflect rays of light from said lamp through the other window, holding means in the housing for holding a copy of which the density is to be measured whereby the copy will be illuminated by said lamp and will reflect light through the aperture in said housing, positioning means adapted to locate a density in the path of the light rays passing through the window in the housing in alignment with the lamp, a track hinged to the top of said housing, an optional head slidably mounted on said track in covering relation with the windows and aperture in the housing, for movement between two extreme positions on the top of the housing, said optical head provided with a pair of windows which upon movement of the optical head to one position are placed over the two windows in the housing to receive the light passing therethrough, and which in the other position of the head are aligned with the window in alignment with the lamp and the aperture in the housing, an eyepiece on the optical head, an optical system in said head and arranged to receive light rays entering therein to form a comparison field visible in the eye-piece, means for making the length of the light path between the density positioning means and the eye-piece in one position of the head equal to that of the light path between the copy holding means and the eye-piece in the other position of the head, said means including a mirror system slidably mounted in the optical head for movement between one position wherein it is added to the optical system to increase the length of the light path entering one window in the head, and a second position wherein it is removed from the optical system, and a gib and slot connection between the head and the mirror system whereby movement of the head between its two positions inserts or removes the mirror system from the optical system therein.

JOHN W. McFARLANE.
CHARLES A. MORRISON.

CERTIFICATE OF CORRECTION.

Patent No. 2,146,904.  February 14, 1939.

JOHN W. McFARLANE, ET AL.

It is hereby certified that error appears in the printed specification of the above numbered patent requiring correction as follows: Page 8, second column, line 20, claim 12, for the word "optional" read optical; and that the said Letters Patent should be read with this correction therein that the same may conform to the record of the case in the Patent Office.

Signed and sealed this 2nd day of May, A. D. 1939.

Henry Van Arsdale (Seal)  Acting Commissioner of Patents.